2 Sheets—Sheet 1.

C. D. SMITH.

Assignor to D. J. MORRELL.

Steam-Boiler Furnaces

No. 7,954. Reissued Nov. 20, 1877.

Witnesses:

J. C. Brecht.

A. H. Norris

Inventor:

Charles D. Smith, by James L. Norris,

Attorney.

N. PETERS, PHOTO-LITHOGRAPHER WASHINGTON, D. C.

C. D. SMITH.

Assignor to D. J. MORRELL.

Steam-Boiler Furnaces

No. 7,954. Reissued Nov. 20, 1877.

Witnesses:

J. C. Brecht.

A. H. Norris.

Inventor:

Charles D. Smith, by James L. Norris

Attorney.

N. PETERS, PHOTO-LITHOGRAPHER, WASHINGTON D. C.

UNITED STATES PATENT OFFICE.

CHARLES D. SMITH, OF PHILADELPHIA, PENNSYLVANIA, ASSIGNOR TO DANIEL J. MORRELL.

IMPROVEMENT IN STEAM-BOILER FURNACES.

Specification forming part of Letters Patent No. 165,690, dated July 20, 1875; Reissue No. 7,954, dated November 20, 1877; application filed August 29, 1877.

*To all whom it may concern:*

Be it known that I, CHARLES D. SMITH, formerly of Boston, in the county of Suffolk and State of Massachussetts, but now of Philadelphia, in the county of Philadelphia and State of Pennsylvania, have invented certain new and useful Improvements in Steam-Boiler Furnaces, of which the following is a specification.

This invention relates to certain improvements in steam-boiler furnaces; its object being to increase the capacity of the boiler and economize fuel, by utilizing the heat absorbed by the walls of the furnace or boiler, as heretofore constructed, for the purpose of heating the water in the boiler and generating an additional quantity of steam, as more fully hereinafter set forth.

To this end my invention consists, first, in a heater composed of sections of columns located at the sides of a steam-boiler, and occupying a space alongside of the grate-bars, said heater being connected at its base with the boiler, in order to receive water from the same, and each section being independently connected at the top to the upper part of the boiler, for the escape of the steam generated in said heater into the boiler; second, in the combination, with a boiler-furnace, of a heater composed of two or more columns, having oblique passages between them, leading from the fire-box to a space between the outer surfaces of the water-columns and the inner side of the wall of the furnace, for the purpose of increasing the heating-surfaces and enhancing the draft through the furnace.

Figure 1:
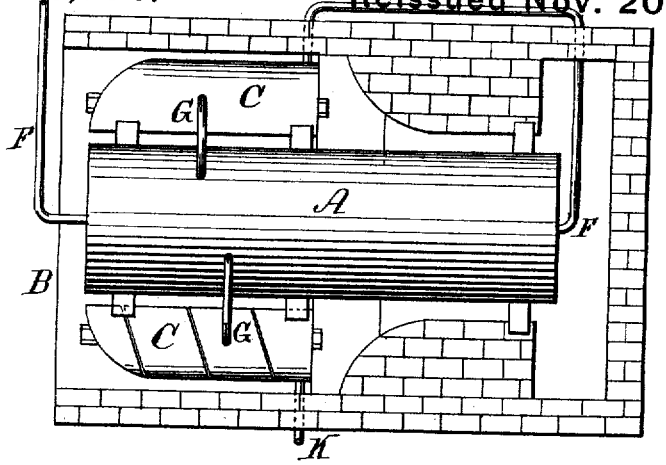
Figure 2:
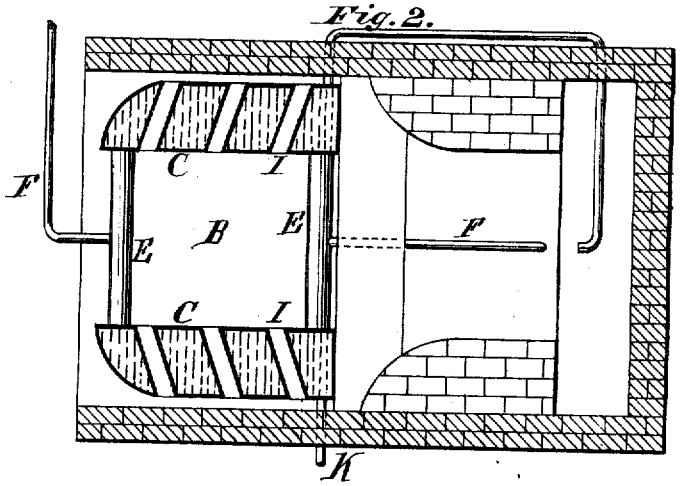
Figure 3:
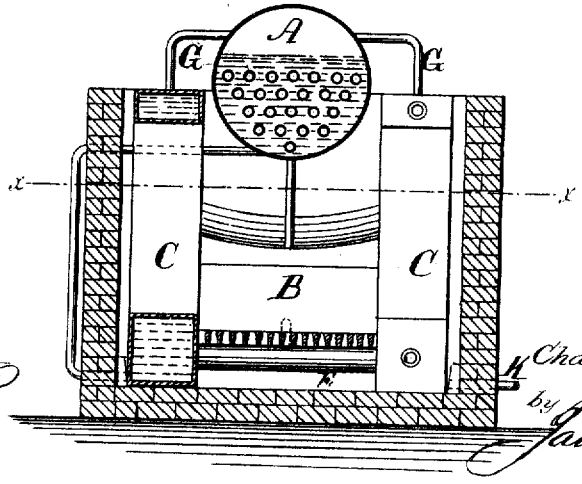
Figure 4:
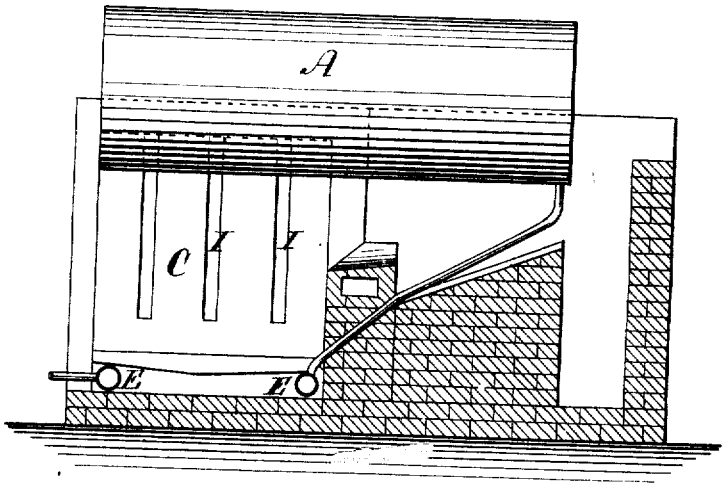
Figure 5:
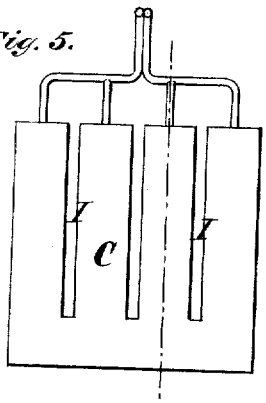
Figure 6:
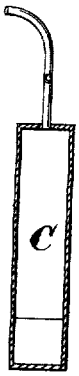
Figure 7:
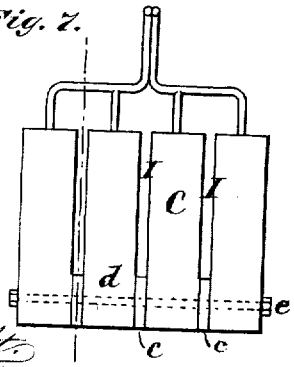
Figure 8:
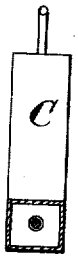

In the drawings, Figure 1 represents a plan view of a steam-boiler furnace embodying my invention; Fig. 2, a horizontal section of the same upon line *x x* of Fig. 3; Fig. 3 represents a transverse vertical section cut through one of the spaces between the columns; Fig. 4, a longitudinal, vertical section through the boiler and furnace; Fig. 5, a detached view of the heater, showing the columns and base as constructed in a single piece; Fig. 6, a transverse section of said heater, as formed in one piece, through one of the columns; Fig. 7, a modification of my heater, showing the columns constructed separately and united at their bases; and Fig. 8, a detached view of one of the columns.

The letter A represents a boiler, which may be of the ordinary cylindrical construction, as shown; and B, the furnace, constructed preferably of brick-work, in the usual manner, in which the boiler is set.

The letter C represents a heater, constructed of hollow columns, said columns being preferably made in separate parts, and connected at their bases by means of nipples *c*, as shown in Fig. 7, and a rod, *d*, passing loosely through the same, the nipples on the outer sides of the columns being suitably packed around the rod to prevent the escape of water, and the rod being secured to the heater by means of screw-bolts *e* at the ends; but the columns and their bases may be formed in one piece and connected as shown in Fig. 5, if desired. Two of said heaters are employed in the furnace, one being arranged on each side of the boiler and the grate-bars in the fire-box of the furnace, the two being united by means of pipes E E, extending transversely across the furnace below said grate-bars.

The letters F F represent a pipe extending from the rear pipes E, or any portion of the lower part of the heater, to the lower portion of the boiler, establishing water communication between said heaters and boilers; and G G are pipes, connecting the upper parts of separate sections of the heaters with the upper part of the boiler, above the water-line in said boiler, establishing steam communication with the boiler and heaters, the pipes F and G operating together to allow the water to feed from the boiler to the heaters and circulate therein, and allow steam formed in the columns to flow into the steam-space of the boiler.

Between the columns of the heater are formed passages I I, extending from the inside of the heaters toward the outside of the same, and inclining toward the front of the furnace, for the purpose of increasing the heating-surface of the columns and facilitating the draft through the furnace, the ends of the first columns being rounded for the same purpose.

The letter K represents a pipe, extending from the lower part of one or both of the heaters, which may serve as a feed-pipe or as a blow-off, if the feed-water is conducted directly into the boiler.

A series of heaters, as above arranged, may be employed when a nest of two or more boilers are used, one or more heaters being placed between two boilers, and connected together and with the boilers, as above described.

The operation of my improvement will be readily understood from the above description.

The water being fed into either the heaters or the boiler, as may be desired, finds its proper level in both, the heaters serving to absorb the heat usually absorbed and wasted by the side walls of the furnace, and to heat an additional quantity of water and generate more steam, thus saving fuel and increasing the capacity of the boiler.

The advantages of the heater, as thus constructed and connected together and with the boiler at their lower ends, are that a thorough circulation of the water from the boiler through the heaters is effected, and any unequal expansion of the parts that would be disastrous to other heaters is overcome, and each section may be made in itself a separate heater, auxiliary to the boiler; and when the columns are separately constructed and united, as shown in Fig. 7, any column or section, in the case of injury, may be removed and replaced, without requiring the renewal of the entire heater.

What I claim, and desire to secure by Letters Patent, is—

1. An auxiliary heater, composed of sections of columns, two or more of said sections being located on each side of a steam-boiler and the grate-bars, and having independent connection with the steam-space, but common connection with the water-space, of said boiler, substantially as described.

2. In the combination, with a boiler-furnace, of a heater, composed of one or more columns, having oblique passages between them leading from the fire-box to a space between the outer surfaces of the water-columns and the inner side walls of the furnace, for the purpose of increasing the heating-surfaces of the columns and enhancing the draft through the furnace, substantially as set forth.

In testimony whereof I have hereunto set my hand in the presence of two witnesses.

C. D. SMITH.

Witnesses:
JAMES L. NORRIS,
JAMES A. RUTHERFORD.

Correction in Reissue Letters Patent No. 7,954.

This is to certify that the annexed Reissued Letters Patent No. 7,954, granted November 20, 1877, for Improvement in Steam-Boiler Furnaces, have been corrected for the purpose of remedying a clerical error by erasing the phrase "assignor to Daniel J. Morrell" and the word "assignee" in the statement of the order to issue, and the name "Daniel J. Morrell" in the granting clause, and by inserting in lieu thereof, at the proper places, the name of "Charles D. Smith," the inventor, it appearing by the instrument of conveyance, recorded April 18, 1878, in Liber M, 21, page 357, of the records of the Patent Office, that at the date of issuing the within Reissued Letters Patent Daniel J. Morrell was not the assignee of the whole or any undivided part of the original Patent, dated July 20, 1875, as required to be by section 4916, Rev. Statutes.

September 9, 1878.